US012667986B2

(12) United States Patent
Low et al.

(10) Patent No.: US 12,667,986 B2
(45) Date of Patent: Jun. 30, 2026

(54) MULTI-PURPOSE DETACHABLE BLADE UTILITY KNIFE

(71) Applicants: David Low, Centralia, WA (US); Douglas Galloway, Centralia, WA (US)

(72) Inventors: David Low, Centralia, WA (US); Douglas Galloway, Centralia, WA (US)

( * ) Notice: Subject to any disclaimer, the term of this patent is extended or adjusted under 35 U.S.C. 154(b) by 89 days.

(21) Appl. No.: 18/886,892

(22) Filed: Sep. 16, 2024

(65) Prior Publication Data

US 2026/0077518 A1 Mar. 19, 2026

(51) Int. Cl.
*B26B 5/00* (2006.01)

(52) U.S. Cl.
CPC .................................... *B26B 5/006* (2013.01)

(58) Field of Classification Search
None
See application file for complete search history.

(56) References Cited

U.S. PATENT DOCUMENTS

| | | | | | |
|---|---|---|---|---|---|
| 3,593,417 | A * | 7/1971 | West | B26B 5/001 | 30/125 |
| 4,408,396 | A * | 10/1983 | Scholl | B26B 5/005 | 30/294 |
| 4,713,884 | A * | 12/1987 | Dunnagan | B26B 5/00 | 30/294 |
| 6,314,646 | B1 * | 11/2001 | Schmidt | B26B 5/001 | 30/162 |
| 6,845,561 | B2 * | 1/2005 | Timson | B26B 5/00 | 30/330 |
| 7,480,997 | B2 * | 1/2009 | Ping | B26B 1/046 | 30/159 |
| 8,006,388 | B1 * | 8/2011 | DeJesus | B23D 51/10 | 30/162 |
| 10,144,139 | B2 * | 12/2018 | Squiers | B26B 5/003 | |
| 2003/0037444 | A1 * | 2/2003 | Chunn | B26B 5/00 | 30/337 |
| 2009/0223063 | A1 * | 9/2009 | Hallquist | B26B 5/001 | 30/162 |
| 2012/0174412 | A1 * | 7/2012 | Ho | B26B 5/001 | 30/152 |
| 2026/0077518 | A1 * | 3/2026 | Low | B26B 5/006 | |

* cited by examiner

*Primary Examiner* — Hwei-Siu C Payer
(74) *Attorney, Agent, or Firm* — Thomas E. Loop

(57) ABSTRACT

A multi-purpose detachable blade utility knife includes a handle with a forward and rearward section, divided by a mid-line sagittal plane. The forward section has a body portion and a removable blade cover, along with a forward-facing blade insertion slot. The rearward section features a blade storage compartment that pivots at the rear end. The knife accommodates a notched cutting blade with U-shaped retention notches and a slotted cutting blade with a blade retention slot. A blade retention mechanism in the forward section uses spring-activated push-button mechanisms to secure either blade in an extended cutting position.

6 Claims, 5 Drawing Sheets

MULTI-PURPOSE DETACHABLE BLADE UTILITY KNIFE

TECHNICAL FIELD

The present invention relates generally to utility knives, and more particularly to multi-purpose utility knives configured to use different types of blades.

BACKGROUND OF THE INVENTION

Utility knives are essential tools in various industries, including construction, packaging, and crafting. They are designed to provide a convenient and efficient means of cutting through different materials such as cardboard, plastic, and even thin metal sheets. Traditional utility knives typically feature a single blade that can be extended and retracted as needed. However, these conventional designs often come with limitations, such as the need for frequent blade changes and the lack of versatility in handling different cutting tasks. Additionally, the safety mechanisms in traditional utility knives may not always be reliable, leading to potential accidents and injuries.

In response to these challenges, there has been a growing demand for more versatile and safer utility knives that can accommodate various cutting needs. Innovations in utility knife design aim to address these issues by incorporating features such as multiple blade types, enhanced blade retention mechanisms, and improved safety features. These advancements not only enhance the functionality of the utility knife but also ensure a higher level of safety for the user. As the need for more efficient and versatile cutting tools continues to rise, the development of advanced utility knives remains a critical area of focus for manufacturers and designers.

Accordingly, and although some progress has been made over the years with respect to the development and advancement of utility knives, there is still a need in the art for new retractable dual-purpose utility knives having enhanced functionality. The present invention fulfills these needs and provides for further related advantages.

BRIEF SUMMARY OF THE INVENTION

A multi-purpose detachable blade utility knife is characterized by a handle divided into left and right sides, with a forward handle section featuring an insertion slot for the blade. It includes notched and slotted cutting blades that can be stored within the rearward handle section when not in use. The knife has a blade retention mechanism comprising upper and lower spring-activated push-buttons to securely hold either type of blade in an extended position for safe handling and usage.

These and other aspects of the present invention will become more readily apparent to those of ordinary skill in the art when reference is made to the following detailed description in view of the accompanying drawings.

BRIEF DESCRIPTION OF THE SEVERAL VIEWS OF THE DRAWINGS

The accompanying drawings illustrate embodiments and different aspects of the present invention and, together with the detailed description, serve to explain certain principles and operation of the invention. It will be appreciated by those skilled in the art that the particular embodiments illustrated in the drawings and described herein are exemplary and as such they do not limit the scope of the invention as established by the appended claims.

In the drawings like reference numerals are used to designate like features throughout the several views of the drawings.

DETAILED DESCRIPTION OF THE INVENTION

Figure 1:
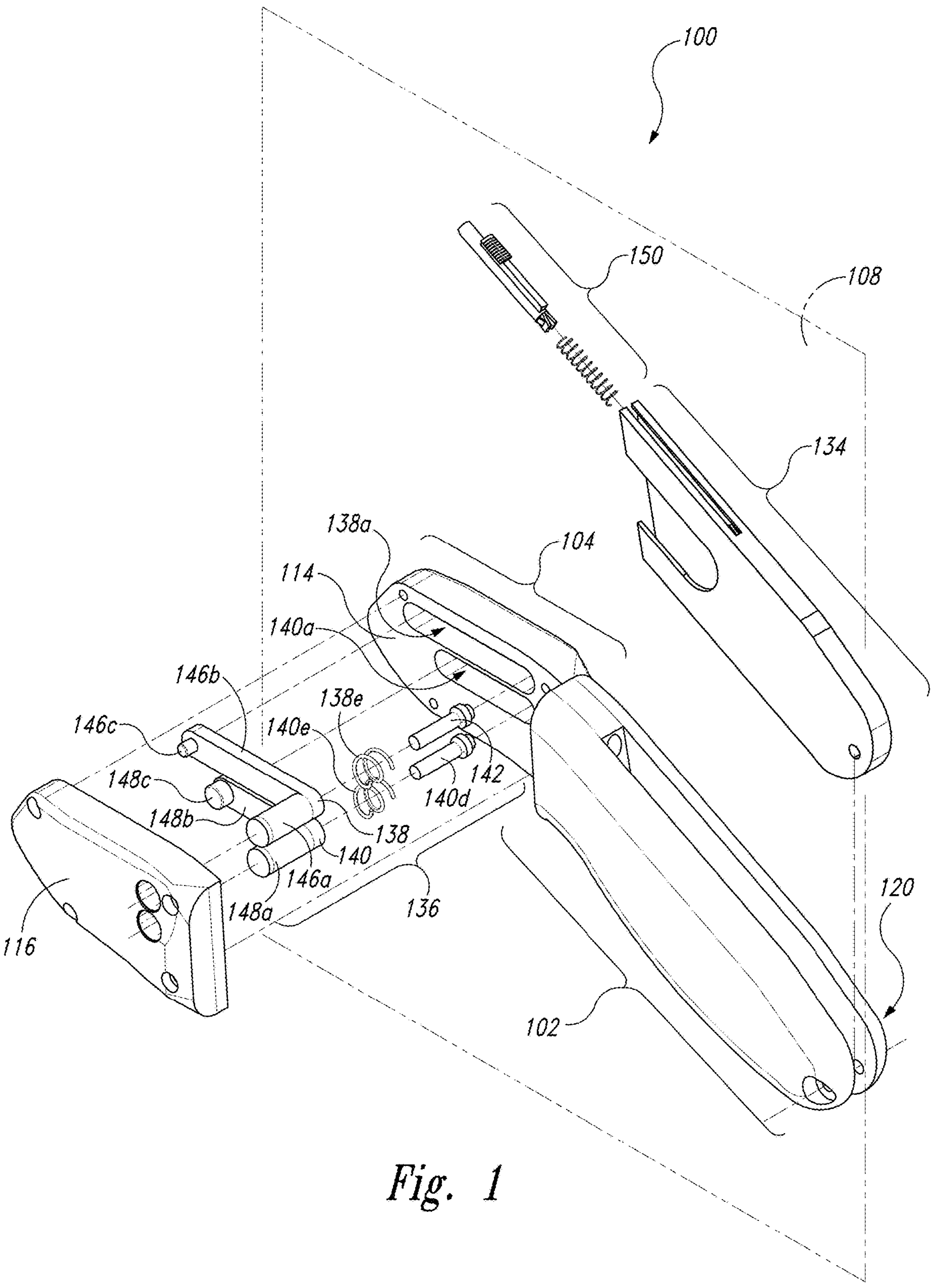
FIG. 1 is an exploded elevated perspective view of a multi-purpose detachable blade utility knife (where a blade storage compartment is in the “closed” position) in accordance with an embodiment of the present invention.
Figure 2:
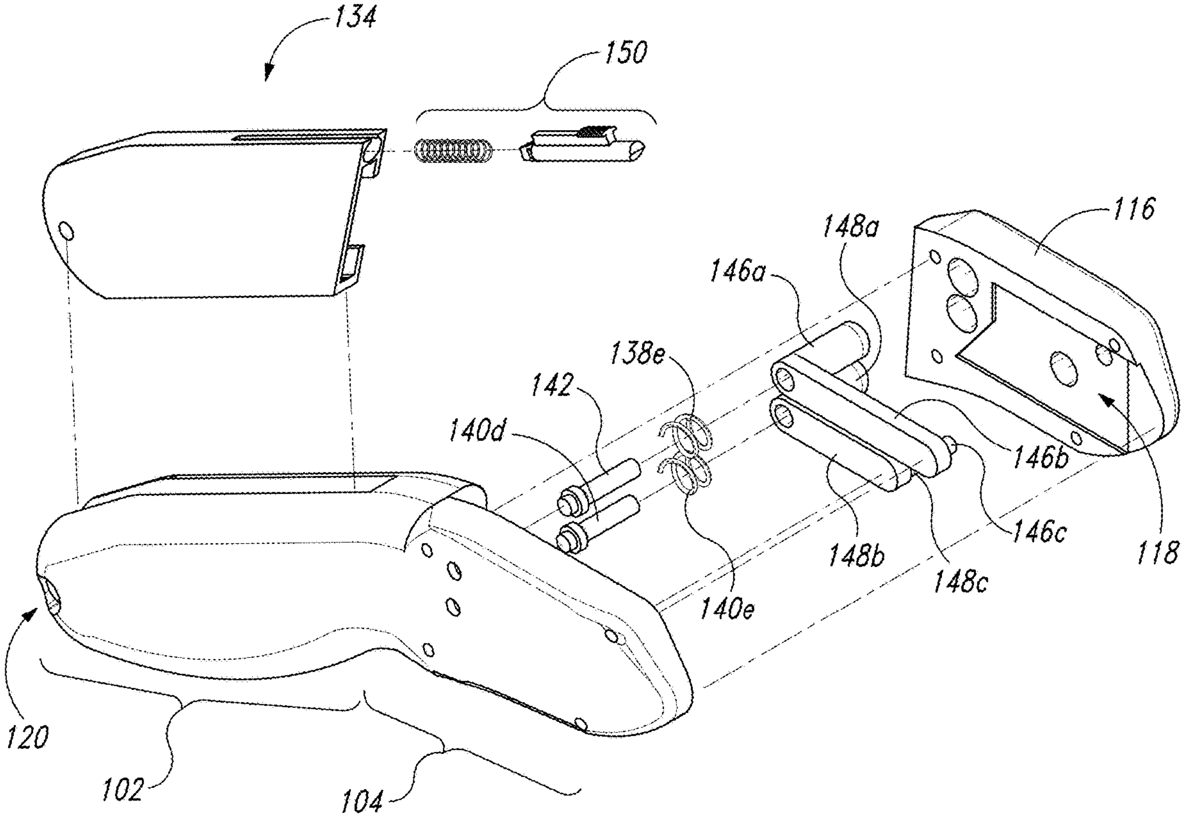
FIG. 2 is an exploded side perspective view of the multi-purpose detachable blade utility knife illustrated in FIG. 1.
Figure 3:
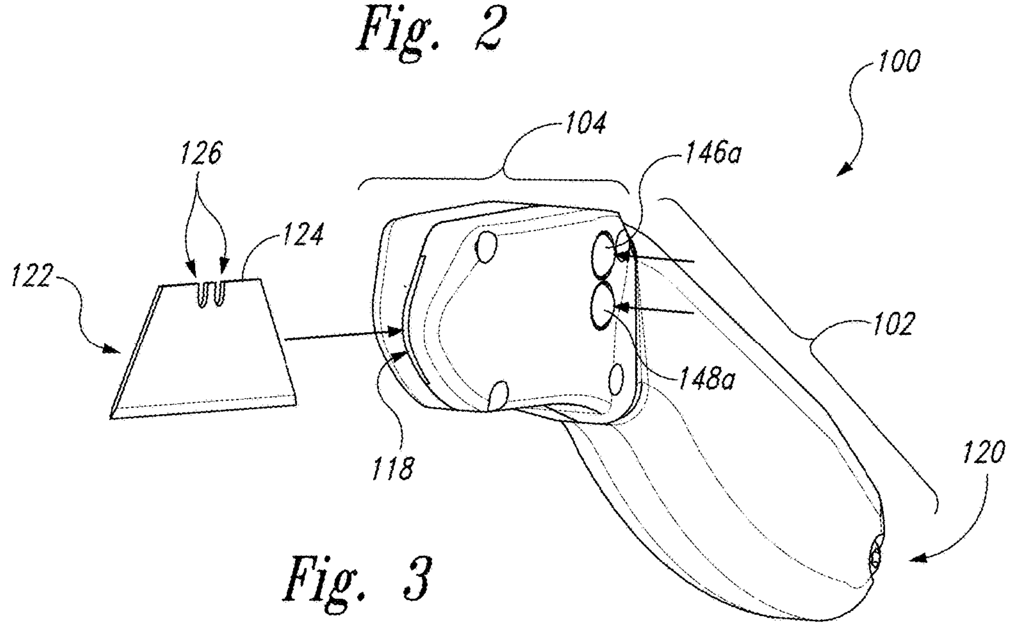
FIG. 3 is a frontal perspective view of the multi-purpose detachable blade utility knife illustrated in FIG. 1.
Figure 4A:
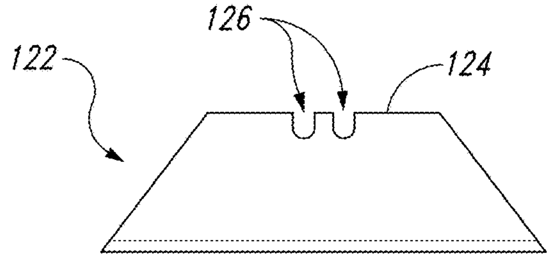
FIGS. 4A-C are top plan views of four different type of knife blades useful in the practice of the present invention, wherein the blades illustrated in FIGS. 4A, 4C, and 4D includes a pair of notches positioned on a top edge and that are sized and configured to engage with a corresponding catch of that is part of a push-button blade retention mechanism in accordance with an aspect of the present invention, and wherein the blade illustrated in FIG. 4B includes a lengthwise central slot that is sized and configured to engage with a corresponding catch of that is part of a push-button blade retention mechanism in accordance with another aspect of the present invention.
Figure 4C:
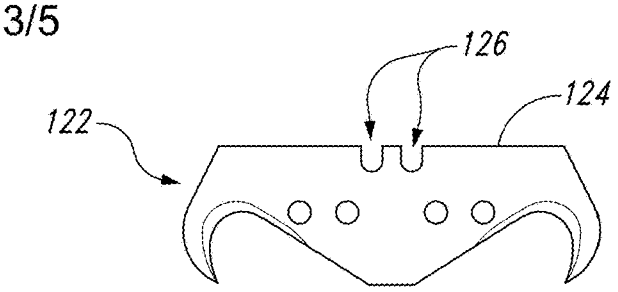
Figure 4B:
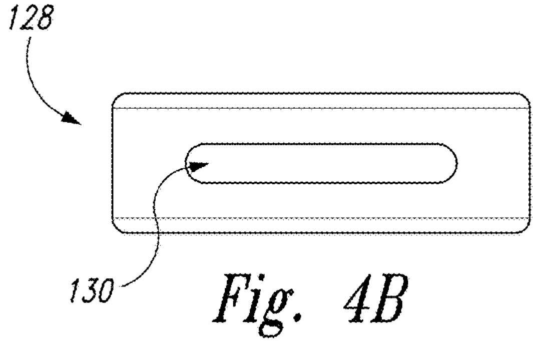
Figure 4D:
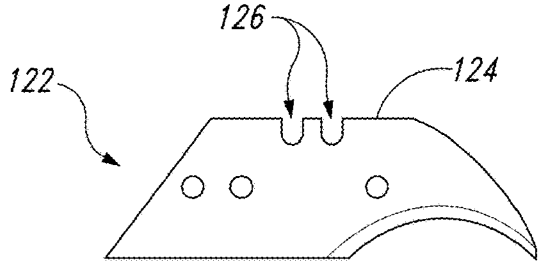

Referring now to drawings (i.e., FIGS. 1-9), the present invention is directed to a multi-purpose detachable blade utility knife 100. As shown, the utility knife 100 comprises a handle 102 connected to a forward blade retention section 104, wherein the utility knife 100 maybe conceptually divided by a lengthwise mid-line sagittal plane 108 into a left-hand side and a right-hand side. The forward blade retention section 104 includes a body portion 114 on one side of the mid-line sagittal plane 108 and a removable blade cover 116 on the other side, along with a forward-facing blade insertion slot 118 (as best shown in FIG. 3) approximately positioned along the mid-line sagittal plane 108. The handle 102 includes a rear end 120. The utility knife 100 also includes a notched cutting blade 122 (as best shown in FIG.

Figure 5:
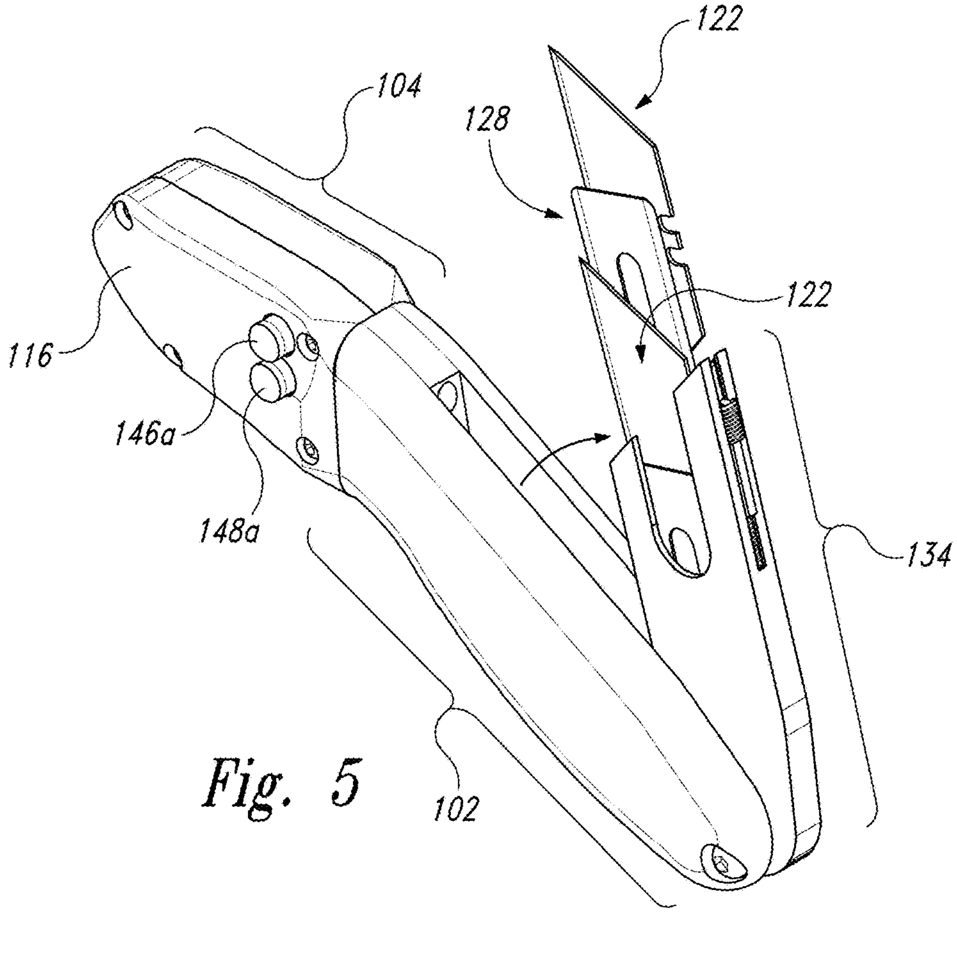
FIG. 5 is an exploded elevated perspective view of the multi-purpose detachable blade utility knife (where a blade storage compartment is partially extended and toward the “open” position and showing three different knife blades partially removed) illustrated in FIG. 1.
Figure 6:
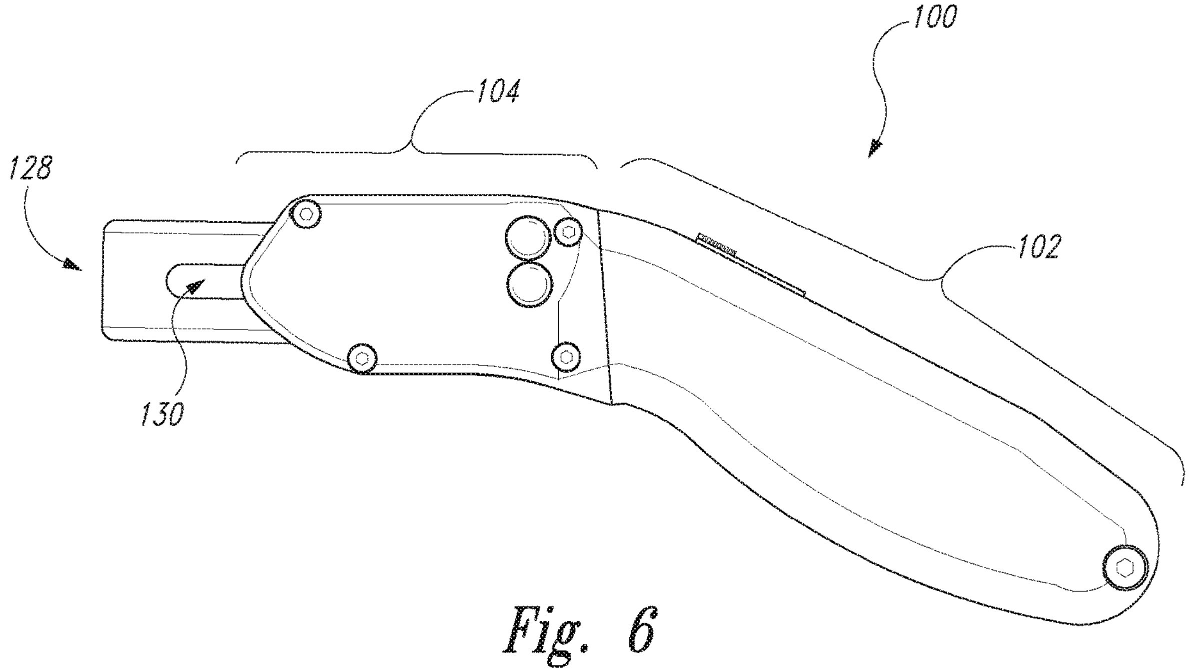
FIG. 6 is a lefthand side view of the multi-purpose detachable blade utility knife illustrated in FIG. 1 wherein a slotted knife blade is fixedly engaged by means of a blade retention mechanism and partially extending away from a forward-facing blade insertion slot in accordance with an embodiment of the present invention.
Figure 7:
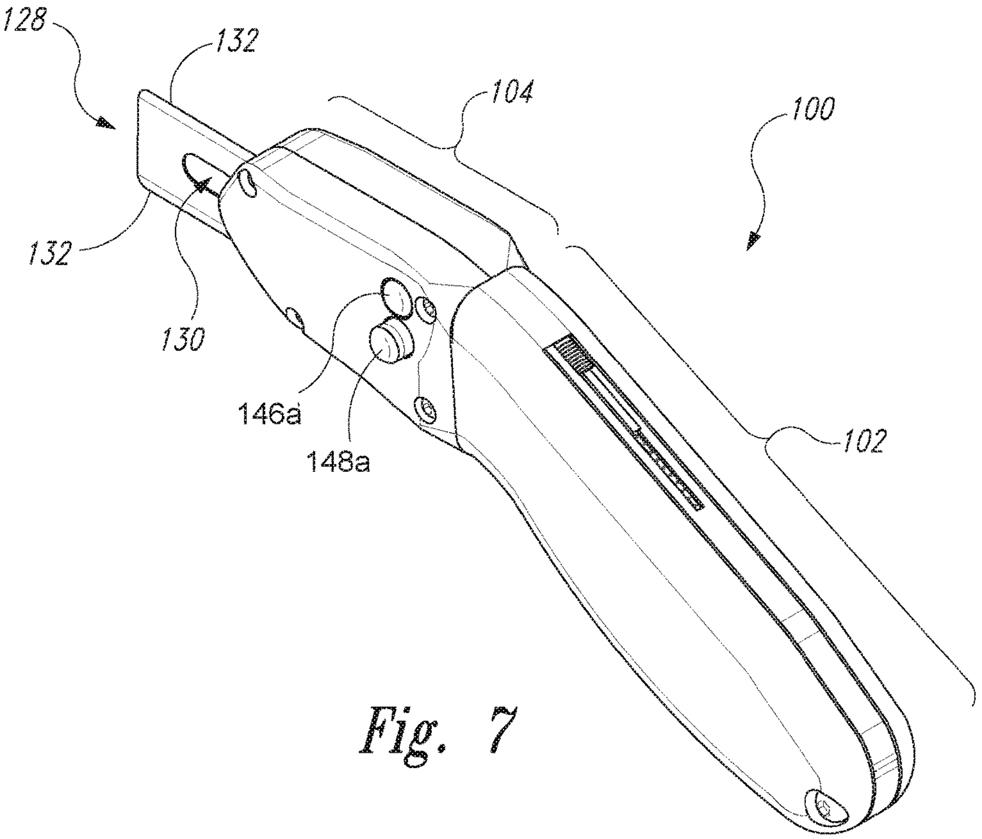
FIG. 7. is an elevated side perspective view of the multi-purpose detachable blade utility knife illustrated in FIG. 6.
Figure 8:
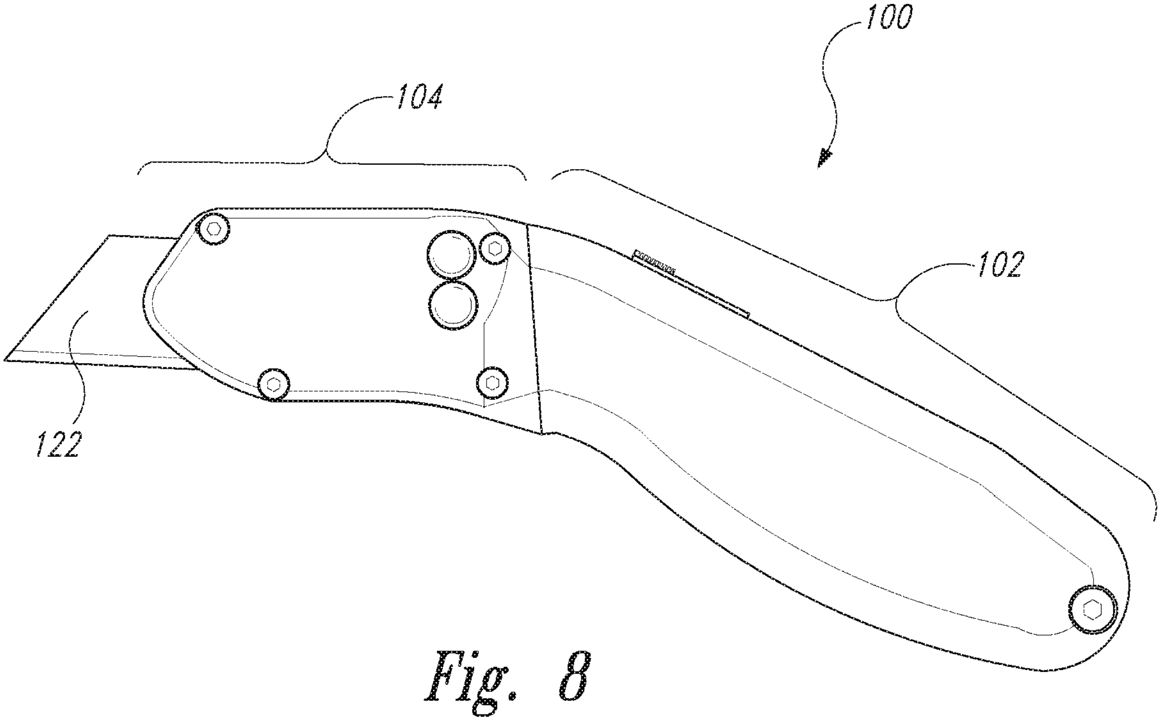
FIG. 8 is a lefthand side view of the multi-purpose detachable blade utility knife illustrated in FIG. 1 wherein a notched knife blade is fixedly engaged by means of a blade retention mechanism and partially extending away from a forward-facing blade insertion slot in accordance with an embodiment of the present invention.
Figure 9:
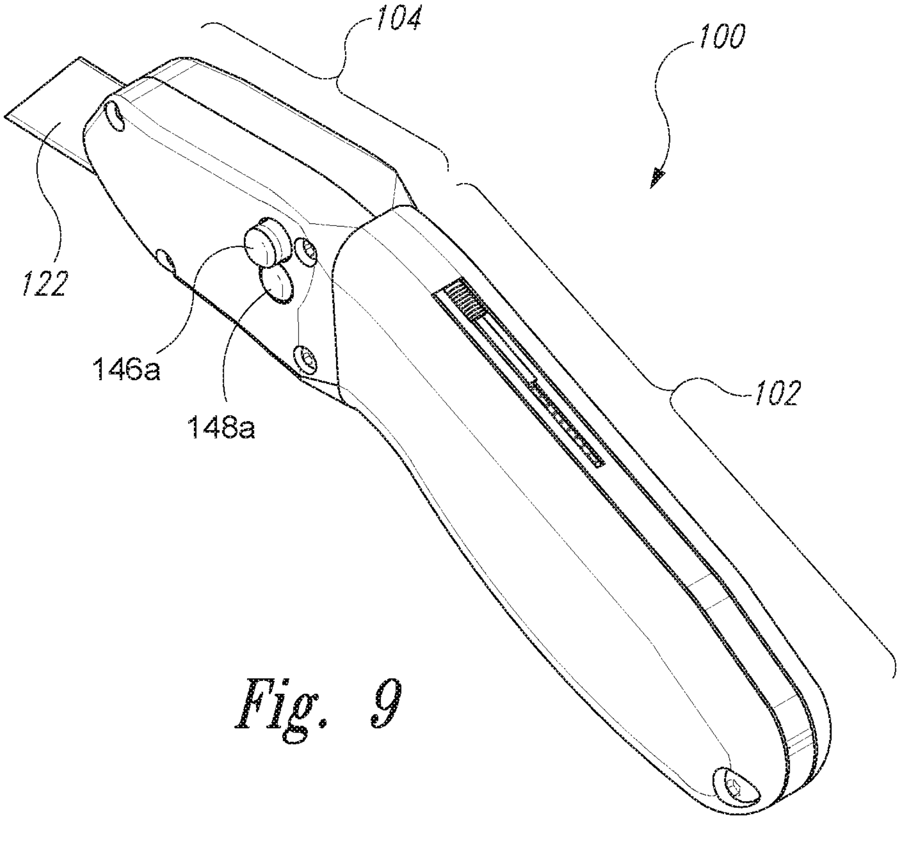
FIG. 9. is an elevated side perspective view of the multi-purpose detachable blade utility knife illustrated in FIG. 8.

3) with an upper straight non-cutting edge 124 that has first and second U-shaped retention notches 126, and a slotted cutting blade 128 (as best shown in FIGS. 6 and 7) with a blade retention slot 130 positioned midway between opposing upper and lower cutting edges 132. A blade storage compartment 134 is sized and configured to store at least the notched and slotted cutting blades 122, 128 within the handle 102. This compartment 134 is pivotably connected at the rear end 120 of the handle 102 and, when closed, fits within the handle 102 and, when open (as best shown in FIG. 5), extends away from the handle 106 along the mid-line sagittal plane 108.

A blade retention mechanism 136 fitted within the forward blade retention section 104 is configured to detachably engage and fixedly retain either the notched cutting blade 122 or the slotted cutting blade 128 in an extended cutting position along the lengthwise sagittal plane 108 and within the forward-facing blade insertion slot 118 of the forward blade retention section 104. The blade retention mechanism 136 consists essentially of a first upper spring-activated push-button mechanism 138 configured to detachably engage and fixedly retain the notched cutting blade 122 when inserted into the blade insertion slot 118, and a second lower spring-activated push-button mechanism 140 configured to detachably engage and fixedly retain the slotted cutting blade 128 when inserted into the blade insertion slot 118.

In accordance with other embodiments, the first upper spring-activated push-button mechanism 138 comprises a first upper groove 138*a* positioned within the body portion 114 of the forward blade retention section 104. The first upper groove 138*a* has a first floor and a first back end, with an outwardly extending first button guide post 142 positioned on the first floor and adjacent to the first back end, perpendicular to the mid-line sagittal plane 108. A first coil spring 138*e* is fitted about the first button guide post 142.

The first upper spring-activated push-button mechanism 138 further comprises a first button guide post sleeve 146*a* fitted about the first button guide post 142 such that the first coil spring 138*e* is between the first floor and the first button guide post sleeve 146*a*, a first arm 146*b* having a forward end and a rearward end fitted within the first upper groove 138*a*, and a first catch 146*c* sized and configured to fittingly engage within either the first or second U-shaped retention notches 126 of the notched cutting blade 122. The first button guide post sleeve 146*a* is connected to the rearward end of the first arm 146*b*, and the first catch 146*c* is connected to the forward end of the first arm 146*b*.

In yet other embodiments, the second lower spring-activated push-button mechanism 140 comprises a second lower groove 140*a* positioned within the body portion 114 of the forward blade retention section 104. The second lower groove 140*a* has a second floor and a second back end, with an outwardly extending second button guide post 140*d* positioned on the second floor and adjacent to the second back end, perpendicular to the mid-line sagittal plane 108. A second coil spring 140*e* is fitted about the second button guide post 140*d*. Lower spring-activated push-button mechanism 140 further comprises a second button guide post sleeve 148*a* fitted about the second button guide post 140*d* such that the second coil spring 140*e* is between the second floor and the second button guide post sleeve 148*a*, a second arm 148*b* having a forward end and a rearward end fitted within the second lower groove 140*a*, and a second catch 148*c* sized and configured to fittingly engage within the blade retention slot 130 of the slotted cutting blade 128. The second button guide post sleeve 148*a* is connected to the rearward end of the second arm, and the second catch 148*c* is connected to the forward end of the second arm 148*b*.

In accordance with further embodiments, the forward blade retention section 104 may be bent at an angle relative to the rearward handle 102.

In additional embodiments, the utility knife further comprises a spring-activated storage compartment latch mechanism 150 positioned on the blade storage compartment 134. The spring-activated storage compartment latch mechanism 150 is configured to lock and unlock the blade storage compartment 134.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A multi-purpose detachable blade utility knife comprising: a handle comprising a forward handle section and a rearward handle section, wherein the handle defines a lengthwise mid-line sagittal plane that divides the handle into a left-hand side and a right-hand side, and wherein the forward handle section includes a body portion on one side of the mid-line sagittal plane and a removable blade cover on the other side of the mid-line sagittal plane, and a forward-facing blade insertion slot positioned along the mid-line sagittal plane, and wherein the rearward handle section includes a rear end; a notched cutting blade having an upper straight non-cutting edge that includes first and second U-shaped retention notches; a slotted cutting blade having a blade retention slot positioned midway between opposing upper and lower cutting edges of the slotted cutting blade; a blade storage compartment sized and configured for storing at least the notched and slotted cutting blades within the rearward handle section of the handle, wherein the blade storage compartment is pivotably connected at the rear end of the rearward handle section and, when closed, fits within the rearward handle section and, when open, extends away from the rearward handle section along the mid-line sagittal plane;

a blade retention mechanism fitted within the forward handle section, wherein the blade retention mechanism is configured to detachably engage and fixedly retain either the notched cutting blade or the slotted cutting blade in an extended cutting position and along the lengthwise sagittal plane and within the forward-facing blade insertion slot of the forward handle section; characterized in that the blade retention mechanism consists essentially of a first upper spring-activated push-button mechanism configured to detachably engage and fixedly retain the notched cutting blade in, when inserted into the insertion slot, an extended cutting position, and a second lower spring-activated push-button mechanism configured to detachably engage and fixedly retain the slotted cutting blade in, when inserted into the insertion slot, an extended cutting position.

2. The multi-purpose detachable blade utility knife of claim 1 wherein the first upper spring-activated push-button mechanism comprises: a first upper groove positioned within the body portion of the forward handle section, wherein the first upper groove has a first floor and a first back end, and wherein an outwardly extending first button guide post is positioned on the first floor and adjacent to the first back end and perpendicular to the mid-line sagittal plane; a first coil spring fitted about the first button guide post; a first mechanical blade retention actuator comprising (i) a first button guide post sleeve fitted about the first button guide post such that the first coil spring is between the first floor and the first button guide sleeve, (ii) a first arm having a forward end and a rearward end fitted within the first upper groove, and (iii) a first catch sized and configured to fittingly engage within either the first U-shaped retention notch or the second U-shaped retention notch of the notched cutting blade, wherein the first button guide post sleeve is connected to the rearward end of the first arm, and wherein the first catch is connected to the forward end of the first arm.

3. The multi-purpose detachable blade utility knife of claim 2 wherein the second lower spring-activated push-button mechanism comprises: a second lower groove positioned within the body portion of the forward handle section, wherein the second lower groove has a second floor and a second back end, and wherein an outwardly extending second button guide post is positioned on the second floor and adjacent to the second back end and perpendicular to the mid-line sagittal plane; a second coil spring fitted about the second button guide post; a second mechanical blade retention actuator comprising (i) a second button guide post sleeve fitted about the second button guide post such that the second coil spring is between the second floor and the second button guide sleeve, (ii) a second arm having a forward end and a rearward end fitted within the second lower groove, and (iii) a second catch sized and configured to fittingly engage within the blade retention slot of the slotted cutting blade, wherein the second button guide post sleeve is connected to the rearward end of the second arm, and wherein the second catch is connected to the forward end of the second arm.

4. The multi-purpose detachable blade utility knife of claim 3 wherein the forward handle section is bent relative to the rearward handle section.

5. The multi-purpose detachable blade utility knife of claim 4, further comprising a spring-activated storage compartment latch mechanism positioned on the blade storage compartment, wherein the spring-activated storage compartment latch mechanism is configured to lock and unlock the blade storage compartment.

6. A multi-purpose detachable blade utility knife comprising: a handle comprising a forward handle section and a rearward handle section, wherein the handle defines a lengthwise mid-line sagittal plane that divides the handle into a left-hand side and a right-hand side, and wherein the forward handle section includes a body portion on one side of the mid-line sagittal plane and a removable blade cover on the other side of the mid-line sagittal plane, and a forward-facing blade insertion slot positioned along the mid-line sagittal plane, and wherein the rearward handle section includes a rear end; a notched cutting blade having an upper straight non-cutting edge that includes first and second U-shaped retention notches; a slotted cutting blade having a blade retention slot positioned midway between opposing upper and lower cutting edges of the slotted cutting blade; a blade storage compartment sized and configured for storing at least the notched and slotted cutting blades within the rearward handle section of the handle, wherein the blade storage compartment is pivotably connected at the rear end of the rearward handle section and, when closed, fits within the rearward handle section and, when open, extends away from the rearward handle section along the mid-line sagittal plane; a blade retention mechanism means fitted within the forward handle section, wherein the blade retention mechanism means is configured to selectively detachably engage and fixedly retain the notched cutting blade and the slotted cutting blade in an extended cutting position and along the lengthwise sagittal plane and within the forward-facing blade insertion slot of the forward handle section.

* * * * *